Dec. 8, 1959   G. W. SCOTT ET AL   2,915,906
SPRING DRIVE APPARATUS
Filed Nov. 1, 1957   2 Sheets-Sheet 1
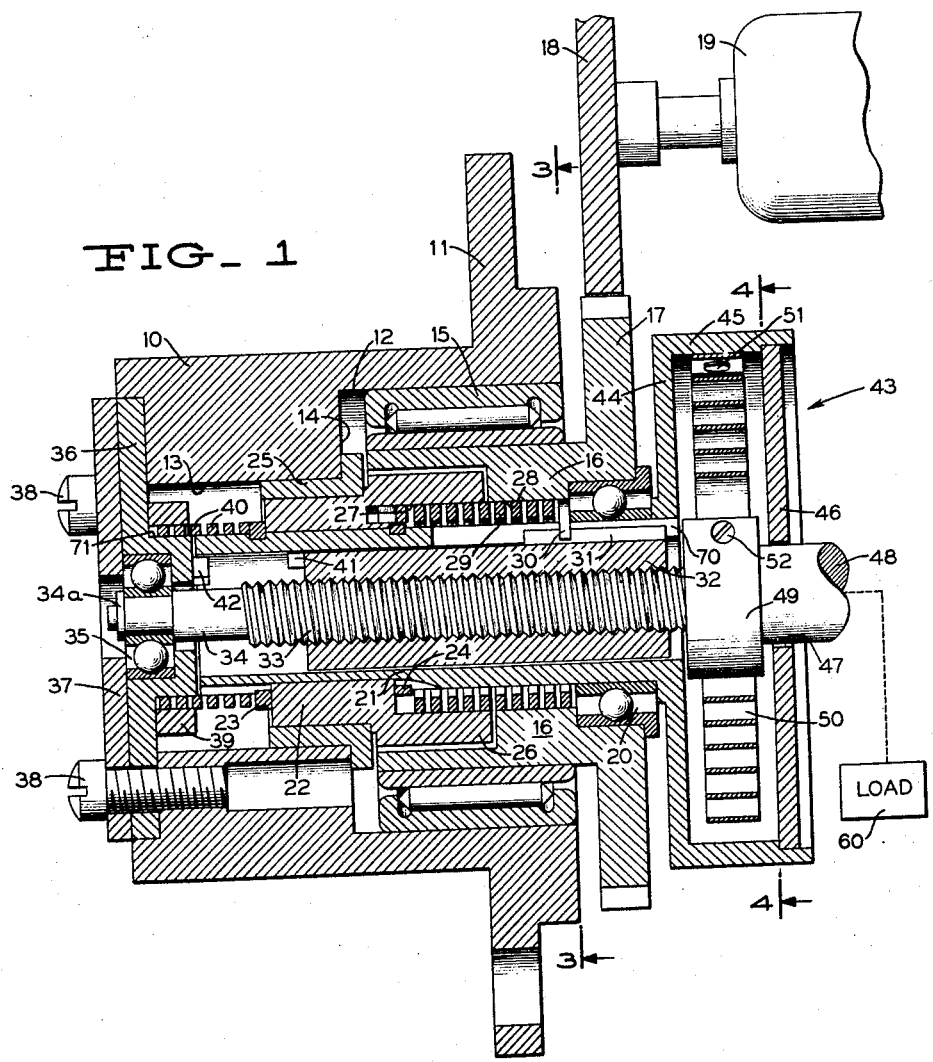
FIG_1
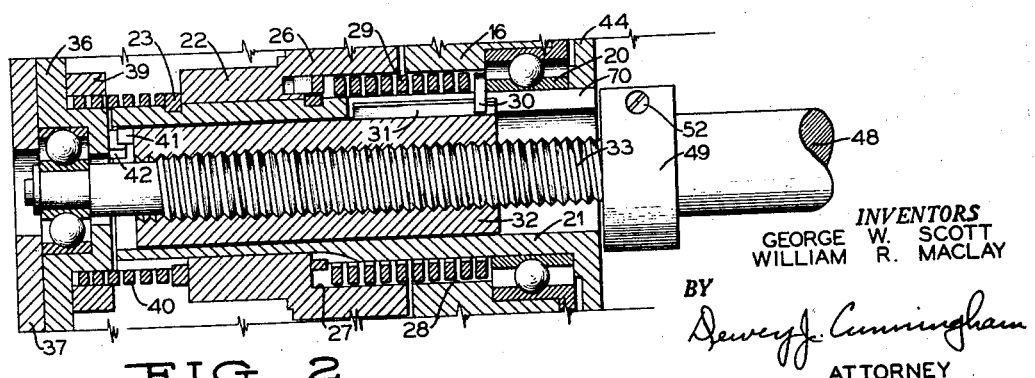
FIG_2
INVENTORS
GEORGE W. SCOTT
WILLIAM R. MACLAY
BY
Dewey J. Cunningham
ATTORNEY

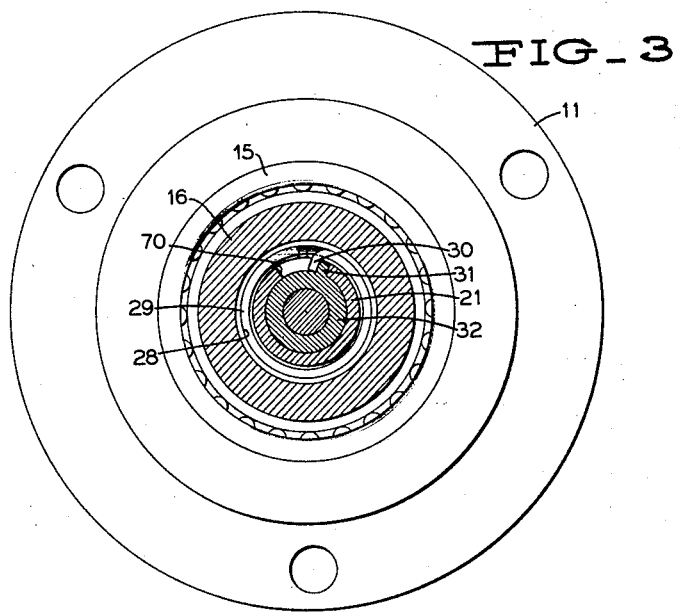
FIG_3
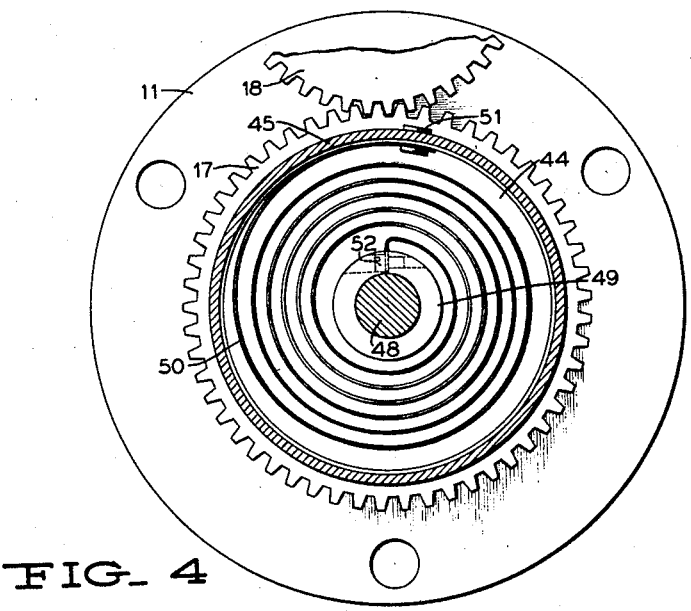
FIG_4

United States Patent Office 2,915,906
Patented Dec. 8, 1959

2,915,906
SPRING DRIVE APPARATUS

George W. Scott and William R. Maclay, Endicott, N.Y., assignors to International Business Machines Corporation, New York, N.Y., a corporation of New York Application November 1, 1957, Serial No. 694,025

5 Claims. (Cl. 74—125.5)

This invention relates to spring drive apparatus and particularly to an arrangement whereby an output shaft has a relatively constant torque available for intermittent use or continuous use at a variable rate.

In the prior art, a number of devices of the spring drive type are known. The best known, perhaps, are spring drive devices wherein a winding mechanism may be periodically operated to wind a spring which is connected in a fashion to supply torque to an output shaft. One disadvantage of such apparatus is that the torque available to do work is non-linear in nature between the time the spring is completely wound and the time it is ready to be rewound. A further disadvantage of the prior art devices is that they are bulky in size, thereby making their use in a limited space a handicap in many applications. In contrast, the present invention is a compact and quite small apparatus for producing a substantially constant torque available at an output shaft. A continuously running input shaft is intermittently connected to wind a spring only when it is necessary to do so in order to provide the aforementioned constant torque. A low r.p.m., variable torque motor may be utilized as an input drive for the spring and the torque available at the output shaft may be released intermittently for variable intervals of time with constant torque, high acceleration, and low moment of inertia.

A primary object of the present invention is to furnish a new and improved spring drive or spring motor arrangement for providing a substantially constant torque available at an output shaft.

Another object of the invention is to provide a new and improved arrangement for coupling a continuously running input shaft to wind a spring only when there is an indication that the spring needs to be wound in order to provide a substantially constant torque to an output shaft.

Still another object of this invention is to furnish a new and improved arrangement as described above which is compact in size and utilizes a minimum of parts.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a cross-sectional view of the present invention showing the input drive motor clutched to wind the spring:

Fig. 2 is a fragmentary view of Fig. 1 showing the clutch in its inoperative position;

Fig. 3 is a view taken on lines 3—3 of Fig. 1; and

Fig. 4 is a view taken on lines 4—4 of Fig. 1.

Similar reference numerals represent similar parts throughout the several views.

Briefly, the present invention comprises a spiral storage spring connected in a fashion to provide a torque to an output shaft. Winding of the spring is accomplished by way of a clutching arrangement comprising a hollow shaft connected to one end of the storage spring and periodically clutched to the input drive motor by way of an expanding helical spring clutch. The clutch is disengaged by means of a movable member which determines when the storage spring is wound. When a predetermined amount of rotation of the output shaft has occurred, the movable member permits the clutch to be reengaged so that winding of the storage spring begins again.

For a more detailed description of the invention, reference is made to Figs. 1 through 4. A cylindrical housing 10 is provided with a mounting flange 11 at one end thereof, the said flange being provided with apertures for mounting in a suitable frame (not shown). The housing is provided with a cylindrical bore 13 which is countersunk to provide an annular recess 12, thereby providing a shoulder 14 between the annular recess 12 and the cylindrical bore 13.

The outer race of a bearing 15 is adapted to have a pressure fit in the annular recess 12, the inner race of the bearing being secured to a collar 16. In this fashion, the collar 16 is journalled for rotation in the housing 10 and serves as an input shaft. A gear 17 is formed integrally with the collar 16 at one end thereof, said gear having teeth on the periphery thereof that are adapted to mesh with a gear 18 which is driven by a suitable motor 19.

A bearing 20 is mounted in an annular recess in collar 16 and is utilized to journal one end of a hollow shaft 21 for rotation within collar 16. A sleeve bushing 22 is keyed to the hollow shaft 21 for rotation therewith. Bushing 22 is prevented from axial movement relative to the hollow shaft 21 by retaining rings 23 and 24 which fit in suitable grooves in the hollow shaft. Bushing 22 is journalled by means of a bearing 25 for rotation relative to housing 10, bearing 25 being secured to housing 10 in the bore 13 and having a portion thereof in abutting relationship to shoulder 14 between the annular recess 12 and bore 13.

A cylindrical extension 26 is provided integral with bushing 22, the extension having an annular recess 27 formed therein which is of the same diameter as the inner surface 28 of collar 16. An expanding type helical spring clutch 29 is situated between the outer surface of the hollow shaft 21 and the inner surfaces 27 and 28. Since the helical spring 29 is urged to expand, it is normally urged against surfaces 27 and 28. This causes the continuously running collar 16 to be clutched to the hollow shaft 21 by way of the cylindrical extension 26 and the bushing 22.

One end of helical spring 29 is turned in to form a finger 30 which is adapted to engage an axially extending rib 31 on an internally threaded elongated sleeve 32. The other end of the spring is adapted to enter a hole in bushing 22 so as to be held in fixed relation thereto. This sleeve might be characterized as an elongated nut since it performs somewhat the same function. The sleeve or nut 32 is adapted to fit within the hollow shaft 21 and to have axial movement relative thereto. A slot 70 is furnished in the hollow shaft 21 and is adapted to receive rib 31 therein, said slot permitting limited rotational and axial movement of nut 32 within the hollow shaft.

The output shaft 34 is provided with a threaded portion 33 which is received by the internal threads of nut 32. Thus, the output shaft is allowable to rotate within nut 32. While the output shaft is allowed to rotate, it is not permitted axial movement relative to the cylindrical housing 10. The left end of the output shaft, as seen in Fig. 1, is journalled in a hub 36 by means of a suitable bearing 35 and secured in position by retaining ring 34a. A bearing retaining ring 37 is arranged adjacent hub 36 and stud bolts 38 are used to secure both the hub and retaining ring to the cylindrical housing 10.

Hub 36 has an annular surface 71 having the same diameter as the annular surface of the hollow shaft 21, there being furnished a helical spring brake 40 which is adapted to fit over these surfaces. Spring 40 has one end portion thereof clamped to surface 71 by means of a ring 39. This spring is of the type used as one way brakes. That is, sleeve 21 is allowed to rotate freely in one direction relative to hub 36 but is prevented from rotation in the reverse direction. This type of spring brake is well known and is used extensively for the purpose described herein. If sleeve 21 is rotated in a direction such that the friction between the sleeve surface and the spring tends to urge an increase in diameter of the spring, the sleeve is allowed to rotate freely. However, when the reverse rotation is attempted, the friction aforementioned urges the spring to contract so that a friction is created between the spring and sleeve which cannot be overcome.

As shown in Fig. 1, the traveling nut 32 is provided with a lug 41 which projects from the left side thereof. A lug 42 is also furnished on the inside of hub 36 and is adapted to be engaged by lug 41 when the travelling nut 32 is moved to the left to its limit of travel.

At the right end of the hollow shaft 21, as seen in Fig. 1, a housing 43 is formed. This housing is comprised of a side 44 which is in the form of a flange on the end of the hollow shaft 21, a cylindrical portion 45 integral with the peripheral edge of side 44, and a cover plate or disc 46 which forms the other side of the housing. The member 46 is apertured, as at 47, to receive the portion 48 of the output shaft. Between the threaded portion 33 and portion 48 of the output shaft, an enlarged portion 49 is formed which fits within the housing.

The storage spring 50 is a spiral spring having one end connected to the cylindrical portion 45 of the housing by means of a rivet 51 and the other end secured to the enlarged portion 49 of the output shaft by a screw 52.

The operation of the invention will now be described in detail. Let is be assumed that the apparatus is disposed as shown in Fig. 1. Under these circumstances, the spiral spring clutch 29 will be expanded against the inner surfaces 27 and 28 of members 26 and 16, respectively. Therefore, bushing 22, hollow shaft 21 and housing 43 will all rotate with the continuously rotating collar 16 which is driven by the motor 19. Since spiral spring clutch 29 also rotates through the members 16 and 22, the finger 30, which engages rib 31 on a travelling nut 32, causes the travelling nut to rotate about the output shaft.

Assuming the output shaft to be stationary, the travelling nut will rotate at the same revolutions per minute as the continuously rotating collar 16 and will move along the output shaft axially thereof due to its threaded relationship therewith until lug 41 engages lug 42. When this occurs, nut 42 has reached the limit of its travel to the left and will stop rotating. However, finger 30 on the helical spring clutch 29 continues to urge the nut to rotate. Since the nut cannot rotate, the diameter of the spring decreases, i.e. contracts and pulls away from engagement with surface 28 of collar 16 and surface 27 of extension 26, as shown in Fig. 2. Therefore, the continuously rotating collar 16 is no longer coupled to rotate bushing 22, hollow shaft 21 and housing 43. At this time, storage spring 50 is completely wound.

As the output shaft is intermittently permitted to rotate to perform some desired work function, the travelling nut 32 is caused to move axially to the right, as seen in Fig. 1. When lug 41 drops off lug 42, the nut 32 is permitted to rotate in the direction in which it is urged by the finger 30 on the helical spring clutch 29. This permits the portion of the spring clutch adjacent the finger to expand until it again engages surface 28 of the continuously rotating collar 16. At this time, the rewinding operation of the storage spring 50 can begin.

It will be seen from the above that even after the rewinding operation begins, the output shaft can continue to perform the work function. It can even be allowed to rotate faster than the input shaft. The limitation of output r.p.m. is determined by the time interval over which it will occur. That is, if the output r.p.m. supplied to a suitable load 60 is faster than the rewinding r.p.m. and occurs over a period of time such that the end of nut 32 engages the enlarged portion 49 of the shaft, the output r.p.m. will drop to the input r.p.m. Therefore, in designing the relationship between input r.p.m. and the combination of maximal output r.p.m. and time interval, the above limitation must be kept in mind.

The present invention is compact, small in size, and provides a high acceleration starting torque.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Spring drive apparatus comprising frame means having an input shaft journalled therein which is adapted to be continuously rotated, a hollow rotatable member journalled in said frame means, a threaded output shaft journalled in said frame means; said input shaft, said hollow rotatable member and said output shaft being concentrically arranged; a storage spring having one end connected to said output shaft and the other end connected to said hollow rotatable member, a sleeve mounted in said hollow rotatable member and threadingly mounted on said output shaft, and clutching means governed by said sleeve for intermittently connecting said rotatable member to said input shaft.

2. Spring drive apparatus comprising frame means having an input shaft journalled therein which is adapted to be continuously rotated, a hollow rotatable member journalled in said frame means, a threaded output shaft journalled in said frame means; said input shaft, said hollow rotatable member and said output shaft being concentrically arranged; a storage spring having one end connected to said output shaft and the other end connected to said hollow rotatable member, a sleeve mounted in said hollow rotatable member and threadingly mounted on said output shaft, expandable spring clutch means adapted to engage and thereby clutch said input shaft and said hollow rotatable member together, and means on said sleeve adapted to engage one end of said spring clutch means when said storage spring is wound for declutching said clutch means.

3. Spring drive apparatus comprising frame means having an input shaft journalled therein which is adapted to be continuously rotated, a hollow rotatable member journalled in said frame means, a threaded output shaft journalled in said frame means; said input shaft, said hollow rotatable member and said output shaft being concentrically arranged; a storage spring having one end connected to said output shaft and the other end connected to said hollow rotatable member, a sleeve mounted in said hollow rotatable member and threadingly mounted on said output shaft, said sleeve being mounted in said hollow rotatable member for limited rotation relative thereto and for axial movement along said ouput shaft in one direction by rotation of the output shaft and in the opposite direction by rotation of said hollow rotatable member, and clutching means governed by said sleeve for intermittently connecting said rotatable member to said input shaft.

4. Spring drive apparatus comprising frame means having an input shaft journalled therein which is adapted to be continuously rotated, a hollow rotatable member journalled in said frame means, a threaded output shaft journalled in said frame means; said input shaft, said hollow rotatable member and said output shaft being concentrically arranged; a storage spring having one end connected to said output shaft and the other end connected to said hollow rotatable member, a sleeve mounted in said hollow rotatable member and threadingly mounted on said output shaft, said sleeve being mounted in said hollow rotatable member for limited rotation relative thereto and for axial movement along said output shaft in one direction by rotation of the output shaft and in the opposite direction by rotation of said hollow rotatable member, an expansible spring having one end secured to said rotatable member, the other end of said expansible spring being adapted to be engaged by said sleeve, said expansible spring being mounted to be clutched to said input shaft when it is allowed to expand and to be declutched from said input shaft when it contracts, said sleeve having means for engaging said frame means and causing said spring to contract when said sleeve reaches the limit of axial movement in one direction, a predetermined further rotation of said output shaft causing said sleeve to be disengaged from said frame means so as to allow said spring to expand.

5. Spring drive apparatus comprising frame means having an input shaft journalled therein which is adapted to be continuously rotated, a hollow rotatable member journalled in said frame means, a threaded output shaft journalled in said frame means; said input shaft, said hollow rotatable member and said output shaft being concentrically arranged; a storage spring having one end connected to said output shaft and the other end connected to said hollow rotatable member, a sleeve mounted in said hollow rotatable member and threadingly mounted on said output shaft, said sleeve being mounted in said hollow rotatable member for limited rotation relative thereto and for axial movement along said output shaft in one direction by rotation on the output shaft and in the opposite direction by rotation of said hollow rotatable member, an expansible spring having one end secured to said rotatable member, the other end of said expansible spring being adapted to be engaged by said sleeve, said expansible spring being mounted to be clutched to said input shaft when it is allowed to expand and to be declutched from said input shaft when it contracts, the reaching of a limit of axial movement of said sleeve in one direction causing said sleeve to rotate with respect to said hollow rotatable member from one limit to the other so as to contract said spring, said sleeve being urged to rotate with respect to said hollow rotatable member back to said one limit after a predetermined amount of rotation of said output shaft.

References Cited in the file of this patent

UNITED STATES PATENTS

| | | |
|---|---|---|
| 1,776,360 | Joyner | Sept. 23, 1930 |
| 2,326,948 | Imperato | Aug. 17, 1943 |